(12) United States Patent
Godwin et al.

(10) Patent No.: US 6,969,736 B1
(45) Date of Patent: Nov. 29, 2005

(54) PLASTICIZERS FROM LESS BRANCHED NONYL ALCOHOLS

(75) Inventors: Allen D. Godwin, Seabrook, TX (US); Jon E. Stanat, Baton Rouge, LA (US); Richard J. Saplis, Palatine, IL (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/855,553

(22) Filed: May 27, 2004

(51) Int. Cl.[7] ............................. C08K 5/09; C08K 5/12
(52) U.S. Cl. ................... 524/296; 524/141; 524/295; 524/296; 524/297; 524/298; 428/379
(58) Field of Search ............................. 524/296, 298, 524/141, 295, 297; 428/379

(56) References Cited

U.S. PATENT DOCUMENTS

| | | | | |
|---|---|---|---|---|
| 2,842,514 A | | 7/1958 | Bartlett et al. ............. 260/31.6 |
| 4,401,720 A | * | 8/1983 | Davis et al. ................ 428/483 |
| 4,426,542 A | | 1/1984 | Barker et al. ............... 568/883 |
| 4,806,425 A | | 2/1989 | Chu-Ba ...................... 428/379 |
| 5,189,105 A | | 2/1993 | Miyazawa et al. ..... 252/182.12 |
| 5,268,514 A | | 12/1993 | Bahrmann et al. .......... 568/882 |
| 5,369,162 A | | 11/1994 | Bahrmann et al. .......... 524/296 |
| 5,382,716 A | | 1/1995 | Bahrmann et al. .......... 568/883 |
| 5,414,160 A | | 5/1995 | Sato et al. .................. 568/883 |
| 5,460,885 A | * | 10/1995 | Chu-Ba ...................... 428/383 |
| 5,462,986 A | | 10/1995 | Bahrmann et al. .......... 524/296 |
| 5,463,147 A | | 10/1995 | Bahrmann et al. .......... 568/882 |
| 5,468,419 A | | 11/1995 | Miyazawa et al. ..... 252/182.12 |
| 5,516,948 A | | 5/1996 | Bahrmann et al. .......... 568/882 |
| 5,583,250 A | | 12/1996 | Bahrmann et al. ............. 560/76 |
| 5,661,204 A | | 8/1997 | Bahrmann et al. .......... 524/296 |
| 6,355,711 B1 | | 3/2002 | Godwin et al. ............. 524/285 |
| 6,437,170 B1 | | 8/2002 | Thil et al. ...................... 560/76 |
| 6,482,972 B1 | | 11/2002 | Bahrmann et al. ............. 560/76 |
| 2004/0138386 A1 | * | 7/2004 | Kumaki et al. ........... 525/334.1 |
| 2005/0020718 A1 | * | 1/2005 | Gosse et al. ................ 523/105 |

FOREIGN PATENT DOCUMENTS

| EP | 0094456 | 5/1986 | ........... C07C 29/16 |
|---|---|---|---|
| EP | 0 603 630 | 7/1993 | ........... C07C 29/17 |

OTHER PUBLICATIONS

"Encyclopedia of Polymer Science and Technology", 2002, by John Wiley & Sons, Inc., Plasticizers, 5. Trimellitate Esters.*
U.S. Appl. No. 10/462,354, filed Jun. 11, 2003.
Encyclopedia of Chemical Technology, Kirth-Othmer, vol. 18, 3rd Edition, John Wiley & Sons, New York, pp. 111-183 (1982).

* cited by examiner

*Primary Examiner*—David W. Wu
*Assistant Examiner*—Mei Q. Huang
(74) *Attorney, Agent, or Firm*—Andrew B. Griffis

(57) ABSTRACT

Less branched $C_9$ alcohols are used to provide plasticizer esters particularly suitable for high temperature applications such as wire and cable insulation.

15 Claims, No Drawings

PLASTICIZERS FROM LESS BRANCHED NONYL ALCOHOLS

FIELD OF THE INVENTION

The invention relates to plasticizers based on less branched $C_9$ alcohols. In an embodiment, the invention relates to less volatile plasticizers based on less branched $C_9$ alcohols particularly suitable for use in PVC resin.

BACKGROUND OF THE INVENTION

Plasticizers are incorporated into a resin (usually a plastic or elastomer) to increase the flexibility, workability, or distensibility of the resin. The largest use of plasticizers is in the production of "plasticized" or flexible polyvinyl chloride (PVC) products. Typical uses of plasticized PVC include films, sheets, tubing, coated fabrics, wire and cable insulation and jacketing, flooring materials such as vinyl sheet flooring or vinyl floor tiles, adhesives, sealants, inks, and medical products such as blood bags and tubing, and the like.

Other polymer systems that use small amounts of plasticizers include polyvinyl butyral, acrylic polymers, poly (vinyldiene chloride), nylon, polyolefins, and certain fluoroplastics. Plasticizers can also be used with rubber (although often these materials fall under the definition of extenders for rubber rather than plasticizers). A listing of the major plasticizers and their compatibilities with different polymer systems is provided in "Plasticizers," A. D. Godwin, in *Applied Polymer Science 21st Century*, edited by C. D. Craver and C. E. Carraher, Elsevier (2000); pp. 157–175.

Plasticizers can be characterized on the basis of their chemical structure. The most important chemical class of plasticizers are phthalic acid esters, which accounted for about 85% worldwide of PVC plasticizer usage in 2002. Two other important chemical classes are adipic acid esters, and trimellitic acid esters. Di- and tri-esters of these aforementioned acids, having a molecular weight range from about 300 to 600, typically offer a balance of solvency and compatibility with the resin, yielding plasticized materials with useful properties and good aging abilities.

Trimellitate esters are used as PVC plasticizers in those applications where greater permanence is required. These esters are similar in structure to the phthalic acid esters, except for having a third ester functionality on the aromatic ring. Trimellitate esters provide for greater permanence primarily from reduced volatility losses and offer reduced losses attributed to lower migration rates into other materials. Plasticized PVC products prepared from either tri-2-ethylhexyl trimellitate (TOTM) or the even more permanent plasticizer triisononyl trimellitate (TINTM) will survive longer periods of high temperature service versus those products prepared from more volatile phthalate plasticizers currently available. However, the trimellitate esters are generally much more expensive, typically costing 2–3 times that of the phthalate esters such as DEHP (di-2-ethylhexyl phthalate) or DINP (diisononyl phthalate) and yield more expensive plasticized PVC products. PVC formulations using trimellitate plasticizers are also more difficult to process when compared with PVC formulations that use only phthalate esters as plasticizers.

Plasticizer selection for electrical wire insulation is dependent upon the performance specifications of the insulation material and the jacketing. Performance specifications and tests such as accelerated aging tests (at various temperatures), and the like are well known in this art and are described by UL (Underwriters Laboratory) methods, e.g., as in the standard UL 83. For example, for those products designed for extended periods of use at 90° C. or 105° C., often evaluated in accelerated oven aging studies for seven (7) days at 136° C., will contain primarily the more costly, harder to process, trimellitate plasticizers. A typical formulation for this 90° C. or 105° C. rated product which must pass the 136° C. aging requirement by maintaining a minimum retention of tensile properties, is shown in Table 1, column A. (European designations are different from those used in the United States. For instance, 105° C. designations according to VDE Specification Code 0207 are YI 8 and YM 4).

On the other hand, flexible PVC insulation designed for extended periods of use at 60° C., characterized by accelerated oven aging testing at 80° C. or 100° C., can be prepared from less costly, easier to process plasticizers such as DINP or DEHP and do not need the more expensive and difficult to process trimellitate esters. A typical formulation for this 60° C. rated product is shown in Table 1, column B.

Flexible PVC compounds prepared with trimellitate esters such as TOTM or TINTM as the sole plasticizer system, generally exceed the minimum retained properties after aging specification for 90° C. or 105° C. electrified wire insulation compounds, such as those required to meet the 105° C. Class 12 (UL62), 105° C. Appliance (UL758), NM-B 90° C. building wire (Romex®, non-metallic sheathed cable, PVC jacket), or THHN 90° C. building wire (thermoplastic PVC insulation, high heat resistant, 90° C. rating, dry or damp, nylon jacket), while those products prepared with only the lower cost phthalate esters fail.

It is a common practice to partially substitute some of the expensive trimellitate esters with less expensive, higher molecular weight phthalate esters. As the concentration of phthalate ester in the plasticizer system increases, performance in the accelerated aging test will decrease, but there is enough flexibility in this formulating to offer a measurable cost savings, and ease of processing improvement, while still meeting the product performance requirements.

An example of this use of trimellitate plasticizer blended with a heavier molecular plasticizer is the formulation described by L. G. Krauskopf, *Handbook of PVC Formulations*, edited by E. J. Wickson, "Monomeric Plasticizers," 1993, John Wiley & Sons, page 201, which describes for UL method 83 THHN applications, an insulation material prepared using the formulation shown in Table 1, column C. "UDP" is undecyl dodecyl phthalate (Jayflex™ UDP, available commercially, as are all Jayflex™ plasticizers cited herein, from ExxonMobil Chemical Company, Houston, Tex.). The stabilizer used is Dythal™ lead stabilizer, available commercially as a phthalate or sulfate salt. According to this reference, the formulation exhibited 72% retained elongation after aging for seven (7) days at 136° C., exceeding the minimum specification of 65% retained elongation.

TABLE 1

| A | B | C |
|---|---|---|
| 100 kg PVC resin | 100 kg PVC | 100 kg PVC |
| 45 kg TOTM | | 25 kg TINTM |
| | 60 kg DINP | 25 kg UDP |
| 20 kg $CaCO_3$ or clay | 50 kg calcium carbonate | 12 kg calcined clay |
| 6 kg lead stabilizer | 5 kg lead stabilizer | 6 kg lead stabilizer |
| 4 kg antimony trioxide | 4 kg antimony trioxide | 4 kg antimony trioxide |
| 0.25 kg stearic acid | 0.25 kg stearic acid | 0.2 kg stearic acid |

Other phthalates commonly blended with trimellitate esters to reduce costs while exceeding specification are diundecyl phthalate (DUP, also available commercially as Jayflex™ L11P), and ditridecyl phthalate (DTDP, available commercially as Jayflex™ DTDP).

The blending of phthalate esters with trimellitate esters to make PVC insulation compounds also contributes to improved processability by reducing the melt viscosity of the flexible PVC compound. In the preparations of PVC compounds for high temperature applications, it is preferable to use as much phthalate ester as possible in the plasticizer mixture, to help reduce costs and improve processability. Phthalate plasticizers blended with trimellitate esters also yield reductions in dry blending times, which also improves the processability of PVC composition.

However, because of the higher volatility of the phthalate esters relative to the volatility of the trimellitate esters, there are practical limitations in the type and level of phthalate esters which cannot be exceeded, for at higher phthalate levels the products begin to fail the retained tensile properties listed in the various specifications. For example, current blends of TOTM with DUP are limited to about 40 wt. % DUP as the maximum level of the phthalate esters because at higher phthalate ester levels, product failures start to occur in retained elongation and retained tensile properties after accelerated aging. For this reason it is common to find commercial products with only 20 wt. % to 40 wt. % DUP in blends with TOTM to avoid product failures. As Jayflex™ DTDP has slightly lower volatility than DUP, it can be used in higher concentrations, replacing higher levels of trimellitate esters. However, it is still limited to about a 60 wt. % concentration in blends with the heavier molecular weight TINTM plasticizer, with more typical concentrations being around 50 wt. % DTDP in TINTM. In other trimellitate esters with higher volatility such as trioctyl trimellitate (TOTM), DTDP is limited to 50 wt. % or less.

In addition to the aforementioned problems, there is also a need for alternative plasticisers to avoid problems with migration out of the plasticized material. Plasticizers with improved compatibility with the PVC resin will migrate less into other systems while plasticizers with poor compatibility can migrate readily.

Important properties of a plasticizer for electrical insulation products include without limitation high plasticizing efficiency, excellent compatibility with the resin, excellent processability, excellent oxidative stability, very low conductivity, and low volatility. Usually, when changes are made to improve one of these properties, some other important property is adversely affected. For example, an increase in alcohol molecular weight tends to reduce volatility at the expense of plasticizing efficiency. In addition, as the molecular weight of the phthalate or trimellitate ester plasticizer increases, its compatability with PVC decreases, eventually resulting in a less desirable flexible PVC product with limited potential.

The range of alcohols useful in esterification for phthalate ester plasticizers is generally limited from about $C_4$ to about $C_{13}$ monohydridic alcohols. It is known that the specific alcohols from which the esters are made influences the performance properties, e.g., the size and structure of the alkyl group helps determine the volatility and gellation temperature of the plasticisers and is therefore chosen according to the application in which the plasticized polyvinyl chloride is to be used. The alcohols from which the plasticisers esters are made are generally obtained by either olefin oligomerization followed by hydroformylation or by hydroformylation of olefins to form aldehydes followed by aldehyde dimerization, generally through an aldol reaction. The alkyl groups of the esters therefore vary in size and structure according to the process used to produce the alcohols.

U.S. Pat. No. 2,842,514 describes using alcohol mixtures obtained by the reaction of aldehydes obtained by the "Oxo" process, wherein an olefin feed is oxonated with carbon monoxide and hydrogen at elevated temperature and pressure in the presence of a cobalt catalyst. Particularly effective plasticizers are said to derive from certain polyhydric alcohols derived from the Oxo process esterified with $C_5$–$C_7$ saturated aliphatic acids.

U.S. Pat. No. 4,426,542 describes a process in which mixed butenes are converted to a $C_{10}$ plasticizer alcohol comprised of at least about 80–90% 2-propyl-heptanol by an oxo reaction. It is taught, for instance, that 2-propylheptanol is a well-suited plasticizer alcohol whereas 2-propyl-4-methyl-hexanol has much poorer properties. This patent teaches to moderate the temperature in the hydroformylation reaction to achieve a higher ratio of normal versus branched product, the former being more desirable.

U.S. Pat. No. 4,806,425 describes the use of electrical wiring products based on dialkyl phthalate esters having at least 11 carbon atoms ($C_{11}$) in the alkyl groups and having a "higher than normal amount of antioxidant." Adding more antioxidant is not a preferred solution to the problem of getting higher phthalate blends because increased antioxidant can lead to decreases in volume resistively and can cause problems with color stability, as well as adding costs.

U.S. Pat. Nos. 5,189,105 and 5,468,419 are directed to obtaining a $C_9$ plasticizer alcohols with good cold resistance and electrical insulating properties, obtained by hydroformylating octenes derived from butene dimerization. The desired product is generally obtained by taking selected portions of the alcohol mixture obtained after conventional hydroformylation.

U.S. Pat. Nos. 5,268,514; 5,369,162; 5,382,716; 5,462,986; and 5,463,147 describe mixtures of isomeric decyl alcohols obtained by hydroformylation of 1- and 2-butene containing mixtures to obtained linear or "slightly branched chain alcohols." Phthalate esters obtained using these decyl alcohols are taught to be useful in PVC compositions, having particularly good "cold resistance."

U.S. Pat. No. 5,414,160 is concerned with an organonickel catalyst system capable of improving the yield and selectivity of octenes having a low degree of branching. The average degree of branching of the octenes is from 0.85 to 1.15. Plasticizer $C_9$ alcohols are obtained after hydroformylation of the thus-described octenes.

U.S. Pat. Nos. 5,516,948; 5,583,250; and 5,661,204 describe mixture of isomeric decyl alcohols obtained by oligomerization of propylene in the presence of deactivated zeolites as catalyst, followed by separation of the $C_9$ olefins from the oligomer mixture, then hydroformylation of the $C_9$ olefins to $C_{10}$ aldehydes, followed by hydrogenation to the corresponding alcohols. The mixtures are esterified with phthalic acid or anhydride. The alcohol product claimed in the U.S. '250 patent is at least 80% linear.

U.S. Pat. No. 6,355,711 describe a plasticizer ester prepared by esterifying an acid or anhydride with $C_7$–$C_{11}$ oxo alcohols prepared by hydroformylating $C_6$–$C_{10}$ olefins having at least 50% methyl branching at the beta carbon. Examples of this invention are $C_9$ phthalate esters obtained from the $C_9$ alcohol produced by the hydroformylation of 2-methyl-heptene-1 or 2-methyl-heptene-2. They are described by the patent as being useful particularly in the manufacture of PVC automotive interior trim applications, and in electrical wire jacketing compounds, however, the plasticizers discussed are too volatile for certain high-temperature applications, e.g., high temperature electrical wiring.

U.S. Pat. No. 6,437,170 relates to a mixture of isomeric nonanol diesters of adipic or phthalic acid, wherein the alcohol component of the diesters are formed from an isomeric nonanol mixture. The composition is characterized by a specific ratio of methylene groups to methyl groups in the isononyl radical, as measured by $^1$H NMR spectra, obtainable preferably by butene dimerization using a nickel oxide catalyst followed by hydroformylation.

It is known that as the linearity of the alcohol used to make the phthalate ester increases, certain predictable events occur. One may expect reduced plasticizer volatility, improved plasticizer efficiency towards making PVC flexible, improved low temperature and flexibility, and sometimes improved processability, the latter characteristic being often a combination of plasticizer solvency and plasticizer viscosity. Linearity is usually defined by either a branching index or by the number of branches per alkyl side chain as determined by proton NMR analyses. As the linearity of a plasticizer increases, its compatibility with PVC can decrease, where "compatibility" is used to reference a usable product with no or slight exudation under stress. For trimellitate esters, the most common alcohols used to prepare the ester are $C_7$ through $C_9$ primary alcohols.

Recently, plasticizer compositions based on less branched $C_{1-3}$ alcohols, and their use with trimellitate esters, in particular Jayflex™ TINTM and TOTM, in PVC compositions, was described in U.S. patent application Ser. No. 10/462,354, filed Jun. 11, 2003. Jayflex™ TINTM, is derived using a branched $C_8$ olefin obtained from a solid phosphoric acid unit followed by hydroformylation over cobalt in the OXO process. Jayflex™ TINTM has an average 2.0 branches per alcohol moiety and a branching index of 22% (assuming that all branches are methyl branches and that the average carbon number of the alcohol side chains is 9.2). These analyses are usually obtained through a combination of proton NMR, carbon-13 NMR, and gas chromatography methods. Branching index is defined as the ratio of the average number of branches divided by the average carbon number of the alcohol, expressed as a percent.

Additional references of interest include EP 0 094 456; EP Application Nos. 1982-302440; 1982-302440; Japanese Application Nos. 1992-48106; 1992-349703; 1993-271326; and U.S. Pat. No. 6,482,972.

The present inventors have surprisingly discovered, however, that plasticizers based on trimellitate esters having, as the alcohol moiety, less branched $C_9$ alcohols provide for at least one of the properties of improved processability of the resin/plasticizer mixture, lower volatility and less emissions during process, and improved aging performance characteristics in articles formed therefrom without significantly effecting the other important properties of the plasticizer, and/or plasticizer/resin mixture, and/or final product.

SUMMARY OF THE INVENTION

The invention is directed to plasticizers based on less-branched $C_9$ alcohols, and to such plasticizers with or without other plasticizing alcohols.

The invention is also directed to PVC resin compositions comprising PVC resin and one or more plasticizers based on less-branched $C_9$ alcohols blended with other plasticizing esters.

Still further, the invention is directed to articles comprising a resin and having incorporated therein plasticizers based on $C_9$ less branched alcohols. The plasticizers according to the invention are especially useful when incorporated into resins used in high temperature applications such as wire and cable insulation.

The plasticizers according to the invention are based on trimellitate esters having as the alcohol moiety less branched $C_9$ alcohols. Less branched alcohols are defined herein as alcohols having an average branchiness of at most 1.6. This means that on average there are no more than 1.6 branches per alcohol molecule. Thus, the alcohol molecule (1):

(1) 
$CH_3CH(CH_3)CH_2CH_2CH_2CH_2CH_2CH_2OH$ is a $C_9$ alcohol having a branchiness of 1 and a branching index of about 11%, whereas the molecule (2):

(2) 
$CH_3CH(CH_3)CH_2CH_2CH(CH_2CH_3)CH_2OH$ is a $C_9$ alcohol having a branchiness of 2 and a branching index of about 22%; the average branchiness of a mixture containing 50% of (1) and 50% of (2) is 1.5 (percentages based on number of alcohol molecules in the mixture) and the branching index of the mixture is about 17%. In a preferred embodiment, the $C_9$ alcohols have an average of from 0.5 to 1.6 branches per molecule (branching index of from about 6% to about 18%), more preferably 0.8 to 1.5 (branching index of from about 9% to about 17%). It is preferred that in any of the foregoing embodiments the branches are only methyl and ethyl branches and in another embodiment the branches are only methyl branches. The structures of (1) and (2) are not intended to be limiting, particularly with regard to location of the branches or of the —OH moiety on the chain, but rather are merely illustrative of the definition of branchiness as used according to the present invention.

In an embodiment the plasticizer systems used to prepare flexible polyvinyl chloride (PVC) products for high temperature useful service, such as insulation compounds for 90° C. or 105° C., are based upon mixtures of less branched $C_9$ trimellitate esters with lower cost and/or faster processing phthalate ester plasticizers such as Jayflex™ DTDP (ditridecyl phthalate), Jayflex™ DIDP (diisodecyl phthalate), di-2-propylheptyl phthalate, isodecyl isotridecyl phthalate, 2-propylheptyl isotridecyl phthalate, diundecyl phthalate (available as DUP or as Jayflex™ L11P) or isoundecyl isododecyl phthalate (available as Jayflex™ UDP), where the less branch trimellitate ester is prepared by the reaction of less branched $C_9$ alcohols which were prepared by the hydroformylation of less branched $C_8$ olefins and subsequently esterified with trimellitic anhydride. In accordance with the definition of "less branched alcohols" above, these less branched $C_8$ olefins also have an average branchiness of at most 1.6.

The invention is also directed to trimellitate plasticizing esters based on $C_9$ alcohols wherein the $^1$H or proton NMR spectrum, measured in the solvent $CDC_{13}$, the ratio of integrated area of the resonance signals with chemical shifts in the range of from 1.1 to 3.0 ppm, relative to the internal standard TMS (tetramethyl silane), to the integrated area of the resonance signals with chemical shifts in the range of 0.5 to 1.1 ppm, relative to the internal standard TMS, is about 1.00 to 4.00.

The invention is also directed to mixtures of such $C_9$ esters with other plasticizers, for example and without limitation, less branched $C_8$ and less branched $C_{10}$ trimellitate esters. In another embodiment, the invention is directed to compositions comprising a resin, such as polyvinyl chloride (PVC), and the $C_9$-based plasticizer, with additional plasticizers, fillers such as calcium carbonate or clay, stabilizer systems based on either lead stabilizers or non-lead stabilizers, low flammability additives such as antimony trioxide or zinc borate, antioxidants such as bis-phenol A or Topanol CA, and lubricants and pigments and other additives.

The invention is also directed to plasticized PVC compositions comprising the less branched $C_9$ alcohols described herein, having low amounts of antioxidant therein.

Yet another embodiment of the invention includes articles comprising the aforementioned compositions, particularly higher temperature wire and cable insulation.

Thus it is an object of the invention to prepare a plasticizing ester having less branching on the alcohol moiety than that provided by prior art, in order to reduce the amount of higher molecular weight trimellitate plasticizers required to meet the oven aging specifications. This decrease in the concentration of higher molecular weight trimellitate plasticizer brings the benefits to the flexible PVC formulation of an improvement in the processability of the flexible PVC compound, and improvement in the dry blending time (the time required for the plasticizer to absorb into the PVC resin), an improved electrical resistivity of the insulation compound, and a reduction in the formulation costs.

Another object of the invention is to set forth a plasticizing ester prepared from a isononyl alcohol moiety more compatible with PVC than heretofore commercially available isononyl alcohol-based trimellitate plasticizers.

Yet another object of the invention is to provide a lower cost, easier processing plasticizer system for wire and cable insulation compound, through increased substitution of more expensive trimellitate plasticizers with phthalate ester plasticizers.

These and other objects, features, and advantages will become apparent as reference is made to the following detailed description, preferred embodiments, examples, and appended claims.

DETAILED DESCRIPTION

According to the invention, a trimellitate ester prepared from a less branched $C_9$ alcohol surprisingly offers one or more of the advantages of: reduced or lower volatility, lower viscosity, and improved efficiency as a plasticizer. When used as a resin plasticizer, such as with PVC, it is more permanent, processes more easily and quickly, and yields a lower formulation or product cost system than found for other branched $C_9$ trimellitate esters. The lower volatility of the less branched ester allows for blending at higher phthalate ratios while still passing the performance requirements. This allows for less of the higher cost plasticizers, such as the trimellitates, to be used in blends. Moreover, it is particularly useful in high temperature applications such as wire and cable insulation, automotive wire, and appliance wire. In addition, less branching allows for less antioxidant in the final product, and improved flexibility at lower temperatures.

While the less branched $C_9$ alcohols according to the invention may be esterified with numerous acids and acid anhydrides, such as phthalic and adipic acids or anhydrides, it is particularly useful esterified with trimellitic anhydride to make less-branched isononyl trimellitate (TINTM). In an embodiment, these less branched, lower volatile $C_9$ trimellitate plasticizers are prepared through esterification of trimellitic anhydride with alcohols prepared by the hydroformylation of corresponding less branched $C_8$ olefins. In yet a more preferred embodiment, the less branched $C_8$ olefins are made by oligomerization of butenes over surface deactivated zeolites, as described in more detail below.

In an embodiment, the plasticizing esters according to the present invention are based on a mixture of alcohols comprising less branched $C_9$ alcohols and other alcohols, particularly less branched alcohols, e.g., less branched $C_8$ alcohols. These plasticizing esters are derived from the esterification of acids and/or acid anhydrides with alcohols having a low amount of branching.

The alcohols according to the present invention are preferably derived from the well-known "Oxo" process, wherein compounds containing olefinic unsaturation (hereinafter "olefinic material") are contacted with synthesis gas in the presence of a hydroformylation catalyst, resulting in the formation of a product comprising an aldehyde which has one more carbon atom in its molecular structure than the starting olefinic material. Subsequent hydrogenation and separation (by, for instance, distillation) yields the desired alcohol. Thus, for instance, a feedstream comprising a $C_8$-containing olefinic material will produce a product comprising a $C_9$ alcohol. The prior art is replete with descriptions of the Oxo process per se, as mentioned above. See, for instance, U.S. Pat. Nos. 4,625,067; 5,059,718; and 6,015,928.

In a preferred embodiment, the plasticizer is comprised of a ester wherein in the $^1H$ NMR spectrum, measured in the solvent $CDC_{13}$, the ratio of integrated area of the resonance signals with chemical shifts in the range from 1.1 to 3.0 ppm to the integrated area of the resonance signals with chemical shifts in the range of 0.5 to 1.1 ppm, wherein the chemical shift in ppm is measured relative to the internal standard TMS, is between 1.20 and 3.50. In a more preferred embodiment this aforementioned ratio is from about 2.40 to about 3.50. It has been found that at higher ratios, the processability improves, the volatility decreases, and the flexibility at law temperature improves. The NMR techniques are standard analytical procedures, such as described in High Resolution NMR Techniques in Organic Chemistry by Timothy D. W. Claridge, Pergamon Press, December 1999, and also in the aforementioned U.S. Pat. No. 6,437,170.

When analyzed by $^1H$ NMR, Jayflex™ TINTM, a branched trimellitate ester, gives a ratio of integrated areas, of 0.91. Less branched $C_9$ triisononyl trimellitate, a less branched alcohol according to the present invention, gives an $^1H$ NMR integrated area ratio of about 1.8.

The plasticizer Jayflex™ TINTM is produced by the esterification of trimellitic anhydride with a branched $C_9$ alcohol. This alcohol also contains lesser amounts of $C_8$ and $C_{10}$ alcohols and is produced by the hydroformylation via the Oxo process from "octene," a generic name given to the predominately $C_8$ olefinic material obtained by oligimerization of $C_3$ or $C_4$ or $C_5$ olefins in a solid phosphoric acid (or "SPA") unit described above. This alcohol can be characterized by $^1H$ NMR and by $^{13}C$ NMR as shown in Table 2 below. Table 2 is a comparison of a prior art isononyl alcohol with a preferred less branched isononyl alcohol according to the present invention.

According to a preferred embodiment of the present invention, the feedstream to the hydroformylation process is an olefinic material comprising lightly branched $C_8$ olefins. It is especially preferable that the feedstream comprise $C_8$ olefins are less branched olefins and wherein the branching is short chained, e.g., one or two carbons. These may be, for instance, methyheptenes, dimethylhexenes, and octenes. In an embodiment, the feedstream comprises $C_8$ olefins having an average branchiness of at most 1.6, more preferably 0.5 to 1.6, still more preferably 0.5 to 1.5, yet more preferably 0.8 to 1.5, and yet still more preferably 0.8 to 1.4, where the branch number refers to the average number of branches per alcohol molecule, as defined previously. Also contemplated are ranges from any of the aforementioned lower limits to any disclosed upper limit, e.g., a branchiness of from 0.5 to 1.8 is also a contemplated range according to the present invention. In each of the aforementioned embodiments, it is yet even more preferred embodiment that the branches be only methyl or ethyl or only methyl.

The aforementioned olefins useful in obtaining the alcohols according to the present invention may be obtained by various oligomerization processes, provided that the aforementioned average branchiness is met. In some cases fractionation to provide the appropriate cut of starting material may be necessary, which can be achieved by one of ordinary skill in the art in possession of the present disclosure.

Some of these processes produce a mixture of olefins depending on the starting material and conditions. This is sufficient for the present invention, even advantageous from a cost standpoint, provided at least some less branched $C_8$ is present in the mixture so that upon hydroformylation and hydrogenation a less branched $C_9$ is obtained.

Still more preferably the olefinic material is the olefinic reaction product of the oligomerization of various olefins using surface deactivated zeolite catalysts as described in U.S. Pat. Nos. 3,960,978; 4,021,502; 4,076,842; 4,150,062; 4,211,640; 4,520,221; 4,522,929; 4,524,232; 4,547,613; 4,568,786; 4,855,527; 4,870,038; 5,026,933; 5,112,519; 5,245,072; 5,417,869; 5,985,804; and 6,013,851.

In this most preferred embodiment, the $C_8$-containing olefinic material used as a feedstream in the hydroformylation reaction is prepared by contacting lower olefins under polymerization conditions with siliceous monodimensional acidic zeolites such as ZSM-22 and ZSM-23 zeolite having pore activity and wherein the zeolite surface is rendered substantially inactive for acidic reactions ("selectivated").

The zeolite may be selectivated by treatment with an amine, especially a bulky amine, i.e., one having an effective cross-section greater than that of the zeolite port size. Examples are dialkyl or more preferably trialkylpyridines. A particularly preferred amine is 2,4,6-trimethylpyridine (collidine). Alternatively a surface layer may be deposited, as described in U.S. Pat. No. 6,013,851.

By "lower olefins" or "lower olefinic material" as used herein is simply meant that the starting material to be oligomerized over the zeolite have less carbon numbers than the final product. The oligomers may be in the case of the C9 alcohol product, without limitation, derived from ethylene, or dimers of butene.

The product of this preferred oligomerization product will preferably have at least 95 wt. % and more preferably 99 wt. % mono-olefin oligomers with an average of from 0.8 to 1.6, more preferably 0.8 to 1.3, methyl branches per carbon chain. In one preferred embodiment of the invention the plasticizing ester comprises a $C_9$ alcohol moiety containing no branching other than methyl groups or in another embodiment no branching other than methyl and ethyl groups.

It is preferred that the starting material for the preferred oligomerization process is a $C_4$ olefin (or mixtures thereof), and in a preferred embodiment the olefinic material supplied to the oxonation reactor(s) according to the present invention derive from the oligomerization of $C_4$ olefins using the aforementioned modified zeolites. In another preferred embodiment, the starting material for the preferred oligomerization process is a $C_3$ olefin, more preferably derived from oligomerization of $C_3$ olefin using the aforementioned modified zeolites. In a particularly preferred embodiment, a feed is used comprising butenes (still more preferably n-butene) and propylene in the ratio of about 1:0.01 to 1:0.049 wt. %, yet still more preferably along with paraffins to act as a heat sink in the reaction. The amount of paraffins to use can be determined by one of ordinary skill in the art in possession of the present disclosure.

Another more preferred feed comprises 0.1–20 wt. % isoolefin, particularly isobutylene and or isoamylene, more preferably wherein the content of the isobutylene and/or isoamylene is from 0.5–5.0 wt. %. A preferred source of such a feed is the unreacted effluent from an MTBE unit, which is a yet still more preferable embodiment.

Yet still another preferred embodiment is the use of $C_8$ LAOs and/or $C_8$ LIOs (linear alpha olefins and linear internal olefins, respectively), which terms are well known in the art, as olefinic feed.

Other more preferred olefinic materials used as a feed into the oxonation reactors include oligomers produced by the Octol™ process or the Dimersol™ process or octene obtainable by contacting a butene containing hydrocarbon mixture over a nickel oxide containing heterogeneous catalyst. See, for instance, U.S. Pat. No. 6,015,928. Other process may be used to produce the preferred olefinic starting material, such as by using oligomers produced using solid phosphoric acid (SPA) catalysts and those produced using ZSM-57 catalysts, however additional steps may be necessary to achieve the preferred material, such as fractionation.

Reactor conditions for oligomerization to obtain the feedstream for hydroformylation, for the hydroformylation reaction itself, and for subsequent hydrogenation to the desired alcohols are per se well-known in the art and are not critical to achieve the objects of the present invention.

It is important to recognize that at least some of the objects of the present invention can be achieved by an alcoholic mixture comprising $C_9$ alcohols but also including other alcohols, particularly $C_8$ and lower carbon number alcohols. Thus the olefinic material in the hydroformylation reaction may also be a mixture of $C_8$ olefins along with $C_7$ and lower carbon number olefins.

A comparison of NMR characteristics of commercially available Exxal™ 9 alcohol, produced by hydroformylating "octene" (oligomers of propylene, butenes, and amylenes produced in a SPA unit) and $C_9$ alcohols according to the present invention is shown in Table 2, below.

TABLE 2

Comparison of $C_9$ alcohols

| Product | Exxal™ 9 alcohol | Less branched $C_9$ alcohol |
| --- | --- | --- |
| Octene, branches per molecule | 2.0 | 1.25 |
| $^1$H NMR Results for alcohol | | |
| Average Carbon number | 9.2 | 9 |
| Average branches per molecule | 2.1 | 1.28 |
| $^{13}$C NMR Results for alcohol | | |
| First branch position (% of molecules) | | |
| C2 | 11 | 23 |
| C3 | 32 | 24 |
| C3, C4 disubstituted | 16 | 2 |
| C4 | 24 | 19 |
| C5, C5+ | 15 | 31 |
| Number of quarternary branches/molecule | 0.3 | 0.1 |

Acids and anhydrides which undergo esterification with the alcohols according to the present invention can be any carboxylic acid which undergoes esterification, however, preferably the acid and/or anhydride is trimellitic anhydride.

The esterification process is preferably conducted in the presence of a catalyst. Typical esterification catalysts are titanium, zirconium and tin catalysts such as titanium, zirconium and tin alcoholates, carboxylates and chelates (see, for example, U.S. Pat. No. 3,056,818). Selected acid catalysts may also be used in this esterification process. Esterification processes are per se well-known, such as described in various references discussed in the Background section above.

Typically, the esterification process according to the present invention comprises (a) adding an excess of an alcohol mixture comprising at least one less branched $C_9$ alcohol and the acid and/or anhydride into a reaction vessel, (b) heating the reaction mixture to a temperature and pressure sufficient to obtain boiling of the reaction mixture, and (c) maintaining the conditions for a time sufficient to converting the acid and/or anhydride and the alcohol to the appropriate ester, e.g., in the most preferred embodiment, a trimellitate ester.

Again it is important to recognize that additional alcohols may be present in the esterification process, such as $C_8$ or $C_{10}$ alcohols. It is preferable that these other alcohols also be less branched alcohols. It is preferred, for example the alcohol moiety in the final ester be a mixture of less branched alcohols derived from the hydroformylation of a mixture of higher olefins derived from the oligomerization of a mixture of lower olefins. It is preferred that the plasticizer ester contain at least 50%, more preferably at least 75%, still more preferably at least 90%, most preferably at least 95%, on a molar basis, of the $C_9$ less branched alcohols according to the present invention.

A composition according to the present invention may also contain C10 less branched alcohols described in copending, contemporaneously-filed U.S. patent application Ser. No. 10/855,105, filed May 23, 2004.

The aforementioned plasticizer ester according to the present invention, which comprises the reaction product of an acid or anhydride with a $C_9$ alcohol having a low branching index and preferably wherein the branching is short chain branching, and most preferably wherein the branching is limited to methyl branching or is limited to methyl and ethyl branching, may be mixed with other plasticizers. It may be a mixture with phthalate ester plasticizers such as Jayflex DTDP, Jayflex UDP, Jayflex DIDP, Jayflex L11P, or DUP or various phthalate coesters prepared from blends of differing $C_{10}$ and $C_{13}$ OXO alcohols. It may also be a mixture of the less branched TINTM with other trimellitate esters such as TOTM or Jayflex TINTM or 79TM. Innumerable variations are possible.

One of the particular advantages afforded by the present invention is that it allows for less use of the more expensive trimellitate esters, and also that less oxidant need be used than might be expected (based on the teachings of the prior art as discussed previously) in meeting the performance requirements for high temperature wire insulation. These and other advantages are illustrated by the following examples.

EXAMPLE

Table 3, below, sets forth the compositions used in the following examples and Table 4, further below, sets forth the results achieved.

Composition A is prepared using Jayflex™ DTDP plasticizer and Jayflex TINTM. The DTDP plasticizer is derived by hydroformylating an $C_{12}$ olefin obtained from a SPA unit, and has a branching number of 3.2. The Jayflex TINTM is prepared from C9 alcohols with a branching number of 2.1. This composition is typical of what is used to prepare flexible PVC electrical wire insulation. Although this table illustrates formulations incorporating the phthalate ester Jayflex™ DTDP, similar effects would be observed with the phthalate esters DUP, UDP, DIDP, and other phthalate co-esters prepared with mixtures of $C_{10}$ and $C_{13}$ alcohols or $C_{10}$ and $C_{11}$ alcohols.

A comparative example is Composition B, a flexible PVC composition prepared using reduced amounts of the higher molecular weight TINTM prepared with C9 alcohols having a branching number of 2.1 plasticizer according to the present invention. Composition B is included to show the effects of reduced amounts of the higher branched trimellitate ester Jayflex™ TINTM when replaced by the less expensive phthalate plasticizer Jayflex™ DTDP. While Composition A passes the required retention of elongation after aging at 136° C. for 7 days, Composition B fails this test.

Composition C and Composition D illustrates the primary facet of this invention. While Composition A represents a typical upper limit for traditional DTDP concentrations in blends with the trimellitate plasticizer Jayflex™ TINTM, in products designed for high temperature applications like 105° C. wire, Composition C contains 70% of the $C_{13}$ phthalate ester Jayflex DTDP and 30% of the $C_9$ trimellitate ester based on less branched alcohols according to the present invention. Composition D has the same level of phthalate ester to trimelliate ester as that of Composition B yet it passes the retained elongation requirement after oven aging. Both of these compositions still have essentially the same properties as Composition A in the other performance tests with a slight performance advantage in reduced low temperature testing of ClashBerg and Brittleness temperature.

Compositions C and D illustrates another facet of this invention. U.S. Pat. No. 4,806,425 describes wire insulation compounds for high temperature applications, that can be prepared with higher levels of branched phthalate esters provided the antioxidant Bisphenol-1 A is increased to significantly high levels. High levels of the antioxidant Topanol™ CA have similar effects when used with plasticizers such as DTDP or TINTM, DUP and UDP. Less branched TINTM formulation of Composition C and Composition D need less antioxidant to pass the accelerated aging test. Using less antioxidant in the formulation contributes to lower the cost, improved electrical resistivity, and improved color stability.

Composition C and D also illustrate another aspect of this invention. As the TINTM made with alcohols having a branching number of about 2.1 is replaced with a TINTM made with less branched $C_9$ alcohol, having a branching number of 1.3, the processability of both the plasticizer blend and the flexible PVC compound both improves.

TABLE 3

|  | A | B | C | D |
|---|---|---|---|---|
| PVC[1] | 100 parts | 100 parts | 100 parts | 100 parts |
| Jayflex ® TINTM | 20 | 10 | 0 | 0 |
| Jayflex ® DTDP | 30 | 40 | 35 | 40 |

TABLE 3-continued

|  | A | B | C | D |
|---|---|---|---|---|
| Less Branched TINTM of the present invention | 0 | 0 | 15 | 10 |
| CaCO$_3$ | 12 | 12 | 12 | 12 |
| SP-33 clay[2] | 10 | 10 | 10 | 10 |
| Lead stabilizer[3] | 6 | 6 | 6 | 6 |
| Stearic Acid | 0.25 | 0.25 | 0.25 | 0.25 |
| Sb$_2$O$_3$ | 3 | 3 | 3 | 3 |
| Antioxidant TCA (TOPANOL CA[4]) | 0.2 | 0.2 | 0.1 | 0.1 |
| Processability | Marginal | Marginal | Best | Good |
| Compatibility | Good | Good | Good | Good |
| Accelerated Oven Aging at 136° C. for 7 days | Pass | Fail | Pass | Pass |

[1]PVC resin is Georgia Gulf Corporation's 5415 PVC resin
[2]The clay is Burgess Pigment Company's SP-33 clay
[3]Lead stabilizer is Baerlocher's Dythal ®
[4]Topanol CA is 1,1,3-tris(2-methyl-4-hydroxy-5-t-butylphenyl) butane; amounts refer to the total amount of Topanol CA in the formula, arising from both the Topanol CA which could be found in the plasticizer as well as Topanol CA added during formulation.

Experimental details for the results obtained are as follows:

I. Preparation of Flexible PVC Compositions

Weigh all ingredients according to the formulation in Table 3. Mix all the dry ingredients for one minute in a Hobart mixer (Model N-50) at speed level 1. Slowly add all liquids. Mix 5 minutes at speed 1.

Transfer this composition to the nip of a two roll mill, which is heated to 170° C. Mill for 5 minutes, with the speed set for 28 rpm. Set the gap for 0.045 inches, remove the fused sheet of plasticized PVC and allow to cool.

The plasticized PVC sheet is cut into 6 in by 6 in squares and then molded to specified thickness using a Wabash press (Model 75-184-4 STAC) using a 15 minute 175° C., 1000 psi preheat cycle, followed by a 2 minute at 175° C. 3500 psi mold cycle, and then a 15 minute cooling cycle at 5500 psi of platen pressure.

Testing of Samples, Mechanical Properties

The data reported in Table 4 was developed through the following procedures:

All samples were aged for 7 days, at 23° C. and at 50 (+/−3)% relative humidity before testing:

| Durometer hardness | ASTM D 2240 |
|---|---|
| Tensile properties on 40 ml samples | ASTM D 882 |
| Clash-Berg Tf temperature | ASTM D 1043 |
| Brittleness Temperature | ASTM D 746 |

Accelerated Aging Performance

Die cut specimens, 0.040 inch thick, were suspended on a rotating sample rack, rotating at 6 rpm, in a forced air oven preset at 136° C. The airflow was adjusted to 150 air changes/hour. After 7 days, the specimens were removed and tested for tensile properties according to ASTM D882.

Typically, the amount of antioxidant present in the added plasticizer can be about 0.5% by weight. Trimellitate plasticizers typically would contain about 0.5–0.6% of, for instance, Topanol CA, a commercially available antioxidant. DTDP and other branched phthalate esters prepared from alcohols having a branching number of about 2.0 may have 0.30% of an antioxidant such as Topanol CA. Other antioxidants maybe required at different concentrations depending upon their effectiveness in testing. The level of antioxidant is usually defined around performance targets such as retention of elongation after accelerated aging. It is a particular advantage of the present invention that less antioxidant is typically needed. In an embodiment of the invention less branched C$_9$ trimellitate esters will contain 0.3 wt. % or less, preferably less than 0.2 wt. %, more preferably 0.15 wt. % or less, of antioxidant, based on the weight of the plasticizer. Specific antioxidants which may be useful include bisphenol A, Topanol CA, and Irganox 1046, and the like.

The formulation containing the polyvinyl chloride and the plasticiser according to the present invention, and other phthalate ester plasticizers, may contain other additives. These formulations will contain a stabilizer which counters the effects of aging during process; heat stabilizers reduce the dehydrohalogenation of the polyvinyl chloride at the temperatures at which the formulation is processed and neutralize the hydrochloric acid to prevent that acid from damaging the polymer or the plasticizer any further. Stabilizers, such as benzotriazole and benzophenone, also reduce the degradation by sunlight, ozone and biological agents. The improved ultra-violet stability obtained by the use of the esters of the cyclohexane polycarboxylic acids in place of the corresponding phthalate ester or the trimellitate ester of the present invention and may enable smaller amounts of stabilizers to be used. Typically, the formulations contain from 0.5 to 10 parts, normally from 4 to 7 parts, by weight of stabilizer per 100 parts of the polyvinyl chloride.

Stabilizers to provide stability during heat processing are typically metal compounds, particularly lead salts, which are used in wire and cable applications, organotin, particularly lead salts, which are used in wire and cable applications, organotin compounds, barium, cadmin and zinc salts or calcium/zinc stabilizers. Organic phosphates and polyols may also be used. Lead stabilizers are used in wire and cable applications especially for those products requiring resistance to high temperature aging. Calcium/zinc stabilizer systems are used in wire and cable, foil and sheeting, wall coverings, medical applications, tubes and footwear, food packaging film and fabric coating.

Other ingredients which may be added to the polyvinyl chloride formulations include fillers such as calcium carbonate, titanium dioxide or silica. When used, the filler may be present in an amount up to 75 parts per 100 parts of polyvinyl chloride. Lubricants, pigments and processing acids may be included. Other ingredients will be chosen according to the use to which the formulation is to be put. For example, the formulation may contain flame retardants, blowing agents and kickers, bio-stabilizers, antistatic agents, viscosity regulators such as thickeners and thinners, anti-fogging agents which are particular useful is packaging films and antioxidants, such as bisphenol A.

Fillers are incorporated in the formulations primarily to reduce cost, increase the output of dry blending, increase electrical resistance, increase resistance to ultra-violent light, increase hardness, provide improved heat transmission, and to increase the resistance to heat deformation. Fillers can also impart anti-blocking or anti-slip performance. Examples of suitable fillers include calcium carbonate, clays such as alumino-silicates, silica, dolomite and bauxite. The particular particle size distribution and average surface area of the filler will be chosen according to the properties it is desired to impart, as would be apparent to one of skill in the art.

Lubricants and processing aids may be included to reduce the adhesion between polyvinyl chloride and hot machinery surfaces during processing. The lubricants also affect the frictional properties between resin particles during processing. Examples of lubricants include stearic acid and metal stearates which can also act as stabilizers. Other lubricants that may be used include petroleum waxes, silicon oil, mineral oil, synthetic oils and polyethylene waxes.

The formulations may also contain flame retardants to increase ignition time, reduce flame spreading and rate of burning. The flame retardants should have a high decomposition temperature, low volatility, a minimum effect on thermal and mechanical properties and good resistance to light and ultra-violet radiation. Examples of flame retardants that may be used include halogen containing compounds and phosphorous containing organic compounds such as triaryl, trialkyl or alkyl diaryl phosphate esters. Other materials that may be used include chloroparaffins, aluminum trihydrate $Al(OH)_3$ or antimony oxides $Sb_2O_3$.

TABLE 4

PERFORMANCE OF LESS BRANCHED TRIMELLITATE COMPOUNDS

| Physical Properties | Composition A | Composition B | Composition C | Composition D |
|---|---|---|---|---|
| Shore A Hardness | 90 | 90 | 90 | 90 |
| Shore D Hardness | 42 | 42 | 42 | 42 |
| 100% Modulus (N/mm^2) | 14 | 13 | 13 | 13 |
| Tensile Strength (N/mm^2) | 20 | 20 | 20 | 20 |
| Elongation, % | 293 | 298 | 290 | 303 |
| Clash - Berg (Tf), ° C. | −19 | −20 | −22 | −21 |
| Brittleness (Tb), ° C. | −24 | −24 | −26 | −25 |
| Retained Elongation (%), 136° C., 7 days | 75 | 57 | 80 | 75 |
| Weight Loss (%), 100° C., 7 days | 1.1 | 1.6 | 0.9 | 1.0 |
| Volatility Carbon Black, Wt. Loss, 24 hr., 70° C. | .5 | 0.4 | 0.5 | 0.4 |
| Compound Specific Gravity | 1.320 | 1.317 | 1.319 | 1.317 |

Trade names used herein are indicated by a ™ symbol or ® symbol, indicating that the names may be protected by certain trademark rights, e.g., they may be registered trademarks in various jurisdictions.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims, particularly the following preferred embodiments: (a) a plasticizer ester prepared by esterifying trimellitic anhydride with a less branched $C_9$ alcohol having an average of 1.6 or less branches per alcohol molecule, and especially one or more of the following more preferred embodiments (which may be combined as would be recognized by one of ordinary skill in the art in possession of the present disclosure): wherein in the $^1H$ NMR spectrum of said ester, measured in the solvent $CDCl_3$, the ratio of integrated area of the resonance signals with chemical shifts in the range from 1.1 to 3.0 ppm to the integrated area of the resonance signals with chemical shifts in the range of 0.5 to 1.1 ppm is between about 1.0 and about 4.0 ppm, the chemical shift in ppm measured relative to the internal standard TMS; wherein the less branched $C_9$ alcohol is prepared from less branched $C_8$ olefins made by the oligomerization of butenes over surface deactivated zeolites; wherein said plasticizer ester is prepared by esterifying trimellitic anhydride with a less branched $C_9$ alcohol having an average of 0.5 to 1.6 branches per alcohol; wherein said plasticizer ester has a branching index of less than 18; (b) a composition comprising the aforementioned plasticizer ester, especially as described by the aforementioned preferred and more preferred embodiments, and even more especially wherein said composition further comprises: PVC; further comprises phthalate esters, particularly those selected from DEHP, DINP, and mixtures thereof; further comprises esters selected from the group consisting of TOTM, TINTM, 79TM, diisodecyl phthalate, di-2-propylheptyl phthalate, diundecyl phthalate, diisotridecyl phthalate, isoundecyl isododecyl phthalate, isodecyl isotridecyl phthalate, 2-propylheptyl isotridecyl phthalate, and mixtures thereof (even more especially wherein said plasticizing ester prepared by esterifying trimellitic anhydride with at least one less branched $C_9$ alcohol having less than 1.6 branches per molecule is present in the amount of between 1 and 80 wt. % of the total plasticizer used in the formula, yet even more especially wherein said composition further comprises fillers selected from the group consisting of calcium carbonate, calcined clay, and mixtures thereof, and still more especially wherein the foregoing composition further comprises at least one stabilizer selected from lead stabilizers or from mixed metal salts of calcium, mixed metal salts of zinc or other non-lead containing PVC stabilizer systems); wherein said composition further comprises less than 0.5 wt. % antioxidant, based on the weight of the plasticizer, and/or further comprising less than 0.3 wt. % antioxidant, based on the weight of the plasticizer; and also combinations of the aforementioned embodiments as would be recognized by one of ordinary skill in the art in possession of the present disclosure; (c) an article comprising electrical wiring and flexible PVC insulation, said insulation comprising the aforementioned compositions, especially an article meeting the requirements of at least one of the standards set by THHN 90° C., NM-B 90° C., UL 12, UL 83, UL 758, and 105° C. designations according to VDE Specification Code 0207, and/or an article having insulation comprising at least one phthalate ester plasticizer, and/or wherein said insulation further comprises antioxidant in the amount of less than 0.3 wt. % based on the weight of the plasticizer.

What is claimed is:

1. A composition comprising phthalate esters and a plasticizer ester prepared by esterifying trimellitic anhydride with a less branched $C_9$ alcohol having an average of 0.5 to 1.6 branches per alcohol.

2. The composition according to claim 1, wherein in the $^1$H NMR spectrum of said plasticizer ester, measured in the solvent $CDCl_3$, the ratio of integrated area of the resonance signals with chemical shifts in the range from 1.1 to 3.0 ppm to the integrated area of the resonance signals with chemical shifts in the range of 0.5 to 1.1 ppm is between about 1.0 and about 4.0 ppm, the chemical shift in ppm measured relative to the internal standard TMS.

3. The composition according to claim 1, wherein the less branched $C_9$ alcohol is prepared from less branched $C_8$ olefins made by the oligomerization of butenes over surface deactivated zeolites.

4. The composition according to claim 1, further having a branching index of less than 18.

5. The composition according to claim 1, further comprising PVC.

6. The composition according to claim 1, further comprising phthalate esters selected from the group consisting of DEHP, DINP, and mixtures thereof.

7. The composition according to claim 5, further comprising at least one ester selected from the group consisting of TOTM, TINTM, 79TM, diisodecyl phthalate, di-2-propylheptyl phthalate, diundecyl phthalate, diisotridecyl phthalate, isoundecyl isododecyl phthalate, isodecyl isotridecyl phthalate, 2-propylheptyl isotridecyl phthalate, and mixtures thereof.

8. The composition according to claim 7, wherein said plasticizing ester prepared by esterifying trimellitic anhydride with at least one less branched $C_9$ alcohol having an average of 0.5 to 1.6 branches per molecule is present in the amount of between 1 and 80 wt. % of the total plasticizer used in the formula.

9. The composition according to claim 8, further comprising fillers selected from the group consisting of calcium carbonate, calcined clay, and mixtures thereof.

10. The composition according to claim 9, further comprising at least one stabilizer selected from lead stabilizers or from mixed metal salts of calcium, mixed metal salts of zinc or other non-lead containing PVC stabilizer systems.

11. The composition according to claim 5, further comprising less than 0.5 wt. % antioxidant, based on the weight of the plasticizer.

12. The composition according to claim 5, further comprising less than 0.3 wt. % antioxidant, based on the weight of the plasticizer.

13. An article comprising electrical wiring and flexible PVC insulation, wherein said insulation comprises the composition according to claim 5.

14. The article according to claim 13, wherein said insulation meets the requirements of at least one of the standards set by THHN 90° C., NM-B 90° C., UL 12, UL 83, UL 758, and 105° C. designations according to VDE Specification Code 0207.

15. The article according to claim 13, wherein said insulation further comprises antioxidant in the amount of less than 0.3 wt. % based on the weight of the plasticizer.

* * * * *